(12) United States Patent
Ford

(10) Patent No.: US 6,517,105 B1
(45) Date of Patent: Feb. 11, 2003

(54) STEERING WHEEL ASSEMBLY FEATURING THE ELIMINATION OF A CONTACT COIL

(75) Inventor: Brian Ford, Mt. Clemens, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/120,506

(22) Filed: Apr. 12, 2002

(51) Int. Cl.[7] ................................................ B60R 21/20
(52) U.S. Cl. ..................... 280/731; 74/552; 280/736; 280/742
(58) Field of Search .......................... 74/552; 280/731, 280/740, 742, 736, 730.1

(56) References Cited

U.S. PATENT DOCUMENTS

| | | | | |
|---|---|---|---|---|
| 3,680,884 A | * | 8/1972 | Stephenson | 280/731 |
| 3,768,824 A | * | 10/1973 | Kloppe et al. | 280/731 |
| 3,773,352 A | * | 11/1973 | Radke | 280/731 |
| 5,197,759 A | * | 3/1993 | Kroiss et al. | 280/736 |
| 5,382,046 A | * | 1/1995 | Cuevas | 280/728.2 |
| 5,398,963 A | * | 3/1995 | Fohl | 280/731 |
| 5,676,396 A | * | 10/1997 | Fohl | 280/731 |
| 5,954,359 A | | 9/1999 | Ross | 280/731 |
| 6,129,374 A | * | 10/2000 | Yamada et al. | 280/728.2 |
| 6,371,508 B1 | * | 4/2002 | Baur et al. | 280/728.2 |
| 6,428,036 B1 | * | 8/2002 | Mramor et al. | 280/728.2 |

FOREIGN PATENT DOCUMENTS

EP  0 582 335 A1 * 2/1994

* cited by examiner

Primary Examiner—Paul N. Dickson
Assistant Examiner—Ruth Ilan
(74) Attorney, Agent, or Firm—Jarett Rieger

(57) ABSTRACT

A steering wheel assembly including an inflator subassembly, a steering wheel armature, and a cushion subassembly. The inflator subassembly and the cushion subassembly are located on opposite sides of the steering wheel armature. The inflator subassembly comprises an inflator. The inflator subassembly has a lip, which fits into a circular channel on the bottom portion of the steering wheel armature. The cushion subassembly includes an airbag, a retainer, and an airbag cover. Upon detection of a crash from a crash sensor, the inflator begins to generate gas. The gas flows through the inflator subassembly and then is forced to flow through the hub portion of the steering wheel and into the cushion.

14 Claims, 5 Drawing Sheets

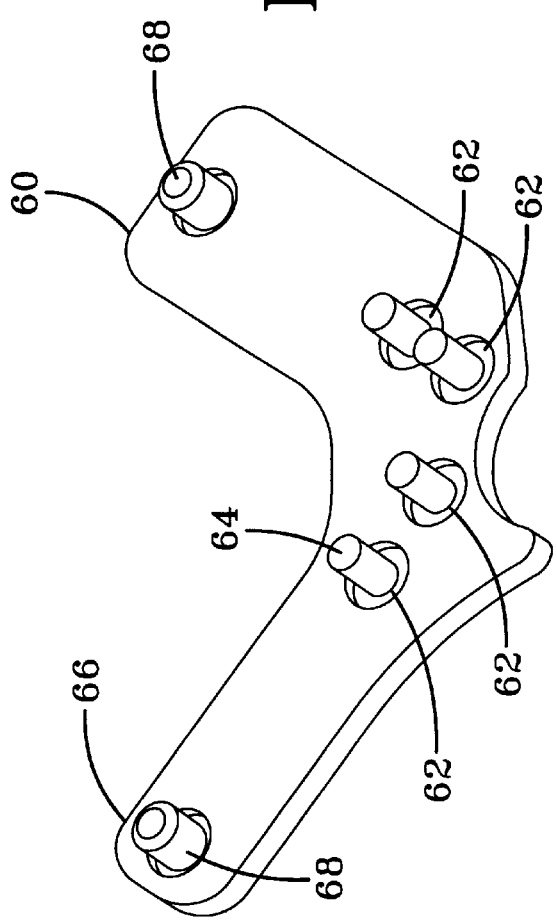
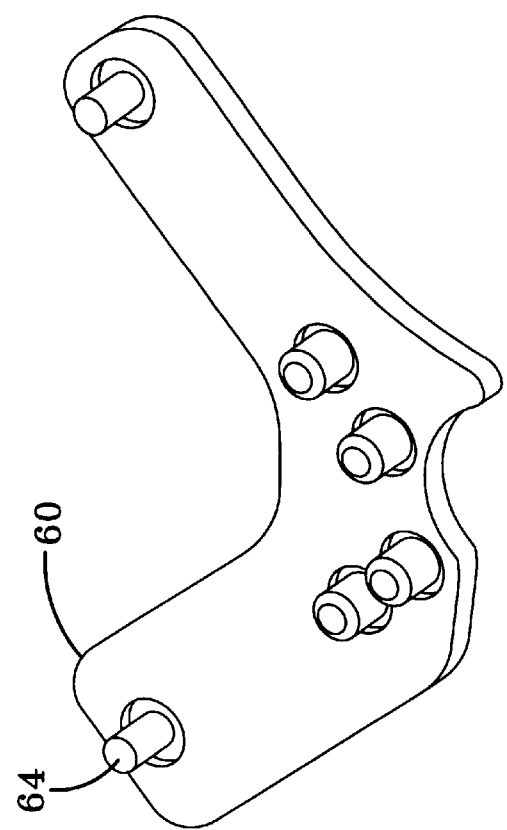

STEERING WHEEL ASSEMBLY FEATURING THE ELIMINATION OF A CONTACT COIL

BACKGROUND AND SUMMARY OF THE INVENTION

The invention generally relates to an air bag module and an associated steering wheel, which features a method providing a continuous electrical connection to the vehicle without the use of a contact coil.

A typical driver side air bag module comprises a housing, an inflator, a cushion and a cover. The housing is mounted at or near the steering wheel armature. The inflator and air bag are located within the housing and the cover (and housing) protects the air bag. When the airbag sensor senses a collision has occurred, an electrical signal is sent through a wiring harness, into a contact coil (also known in the art as "clockspring"), and into the inflator. A contact coil is used to provide a secure, reliable connection regardless of the orientation of the steering wheel. Upon receipt of this signal, the inflator begins to generate gas, which in turn inflates the cushion. As the cushion inflates, the cover is separated permitting the inflating cushion to expand toward the occupant.

If the inflator could remain fixed on (or become part of) the steering column, and the remaining airbag module components were allowed to rotate about it, the contact coil would be unnecessary. A method of doing this that is known in the art was described in U.S. Pat. No. 5,954,359. In this patent, Ross teaches that it is possible to place a tubular inflator within the steering shaft, and then vent the gas within this shaft and into-the airbag cushion. This is a valid solution; however, it requires not only a tubular style inflator but also a special, non-standard steering shaft.

In accordance with the present invention, a steering wheel assembly contains an inflator subassembly comprising a largely circular inflator of the type typically used in driver side airbag modules; the inflator subassembly also contains a flange that has been welded to the inflator before a gas deflector has been attached to the flange. The steering wheel assembly further contains a steering wheel armature containing a circular orifice for receiving gas from the flange and gas deflector; the steering wheel armature further containing features for attachment of the retaining ring to the steering wheel, and for the attachment of the steering wheel armature to the steering shaft. The steering wheel assembly further contains a; cushion subassembly comprising a cushion surrounding the retaining ring, and a cover surrounding the cushion. The steering.wheel assembly further contains a slip ring that serves to pass electrical signals into the steering wheel assembly for electronics such as the horn, cruise control, radio buttons, etc. As will be seen, the inflator, flange, and gas deflector are fixed to the steering column through the use of a bracket, while the steering wheel armature and the cushion subassembly are allowed to rotate about it, and with the aid of a slip ring, electrical signals can be sent-to the steering wheel for devices other then the inflator. As the inflator generates gas, the gas fills the flange and is forced by the gas deflector to flow through the steering wheel armature and into the cushion. The.cushion then expands, opening the cover, and allowing for restraint of the occupant during a collision.

BRIEF DESCRIPTION OF THE DRAWINGS

The features of the invention which are believed to be novel are set forth with particularity in the appended claims. The present invention, both as to its structure and manner of operation, may be understood by referring to the following detailed description, taken in accordance with the accompanying drawings.

FIG. 8 shows a view of the bottom of the attachment bracket.

FIG. 9 shows a view of the top of the attachment bracket.

DETAILED DESCRIPTION OF THE INVENTION

Figure 1:
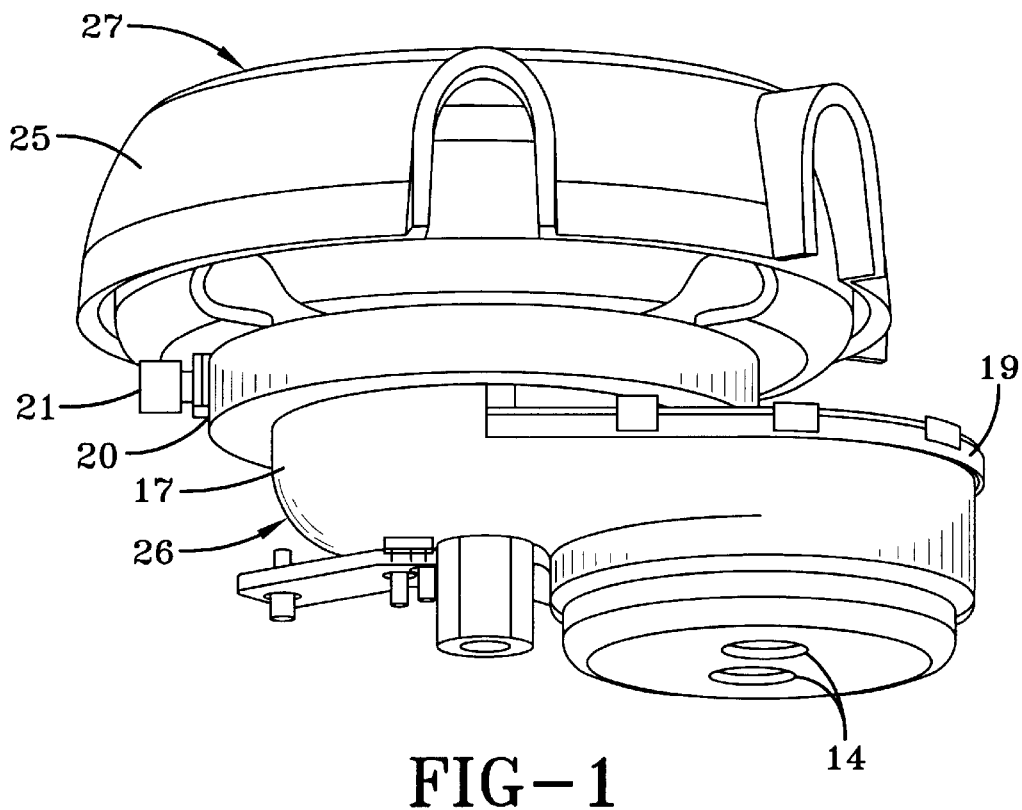
FIG. 1 shows a perspective view of the steering wheel assembly in accordance with the present invention.
Figure 2:
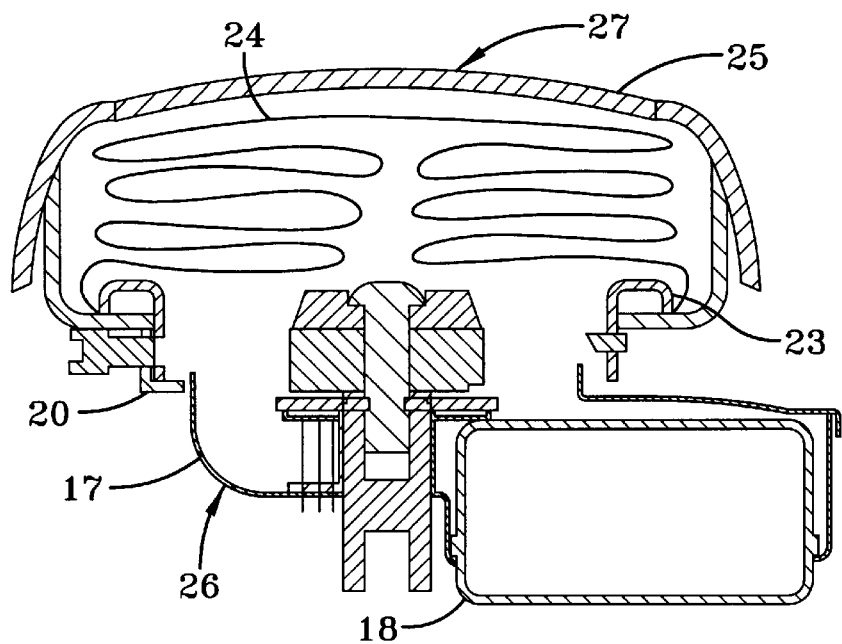
FIG. 2 shows a cross section view of the steering wheel assembly.

FIG. 1 illustrates a steering wheel assembly, which comprises a steering wheel armature 20, an inflator subassembly 26, and a cushion subassembly 27. For the present invention, an inflator 18 is included as part of the inflator subassembly, which is disposed on one side of the steering wheel armature 20 while the cushion subassembly 27 is disposed on.the other side of the armature. The cushion subassembly is positioned on the side of the steering wheel armature 20 that is in closer proximity to the vehicle occupant. FIG. 2 is a cross sectional view of FIG. 1, which also shows that the cushion subassembly 27 and the inflator subassembly 26 are divided by the steering wheel armature 20.

Figure 3:
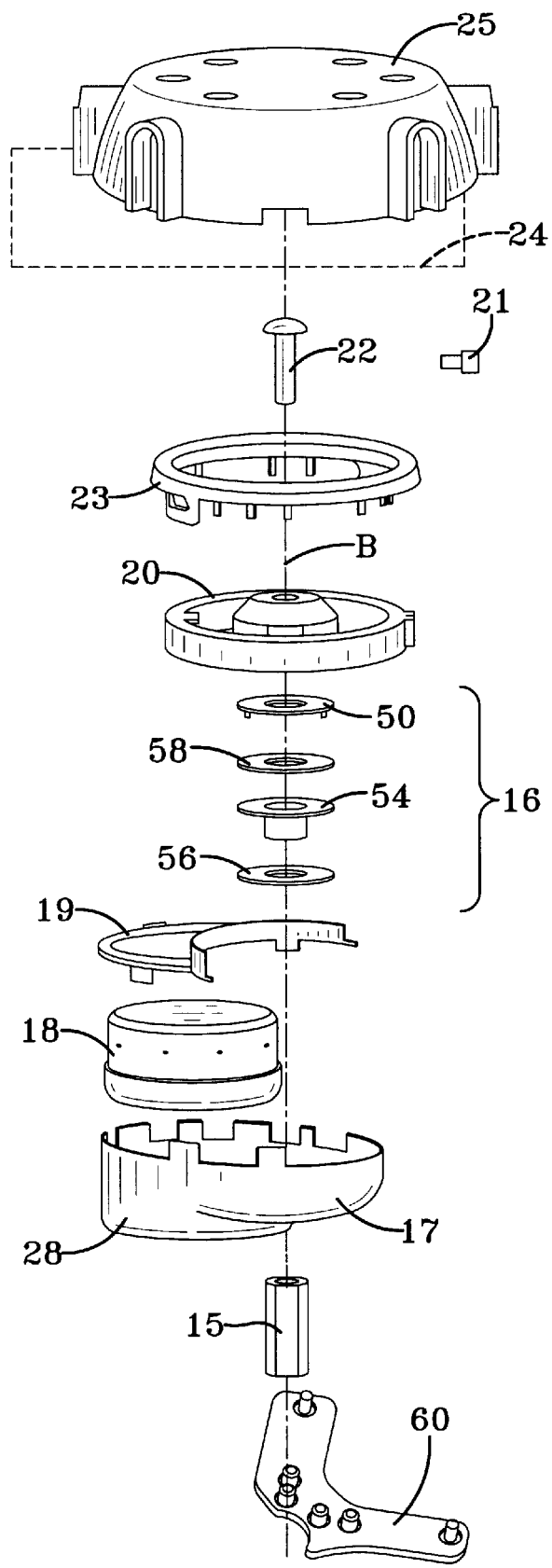
FIG. 3 shows an exploded view of the steering wheel assembly.
Figure 6:
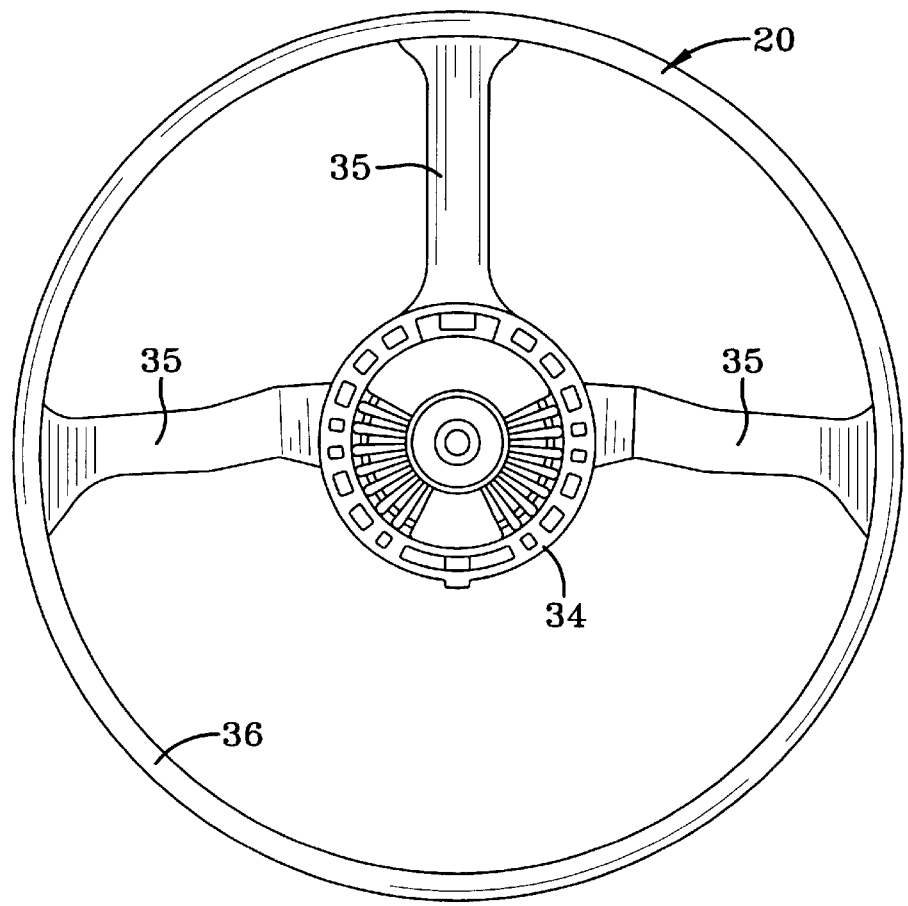
FIG. 6 shows a steering wheel armature.

FIG. 3 depicts the various components for the steering wheel assembly. The steering wheel armature is secured to the steering wheel shaft 15 via a threaded fastener 22. The fastener 22 engages corresponding threads within the steering shaft 15. One skilled in the art appreciates that other fastening arrangements are suitable for the present invention. The entire steering wheel armature 20 is shown in FIG. 6 including the hub portion 34, the spokes 35, and the rim portion 36. The rim portion 36 has an essentially circular shape with a substantially U-shaped cross sectional configuration and is connected to the hub portion 34 by the spokes 35. The rim 36, the spokes 35, and the hub 34 are generally cast from aluminum or magnesium based alloy, but other materials can be utilized.

The hub portion has a steering shaft receptacle adapted to securely couple to the end of the steering shaft 15. The steering shaft 15 is an integral part of the steering column (not shown) and extends therethrough. The steering wheel armature 20 is rotationally coupled to the steering shaft 15, and the steering shaft is connected to a vehicle axis, thus a rotation of the steering wheel brings about a direction change for a vehicle.

As mentioned earlier, the threaded fastener connects the steering wheel armature 20 to the steering shaft 15. This threaded fastener passes through an aperture in the inflator subassembly 26 whereby the rotation of the armature 20 does not cause the inflator subassembly 26 to rotate. Accordingly, the inflator subassembly 26 and the armature 20 are decoupled.

Figure 4:
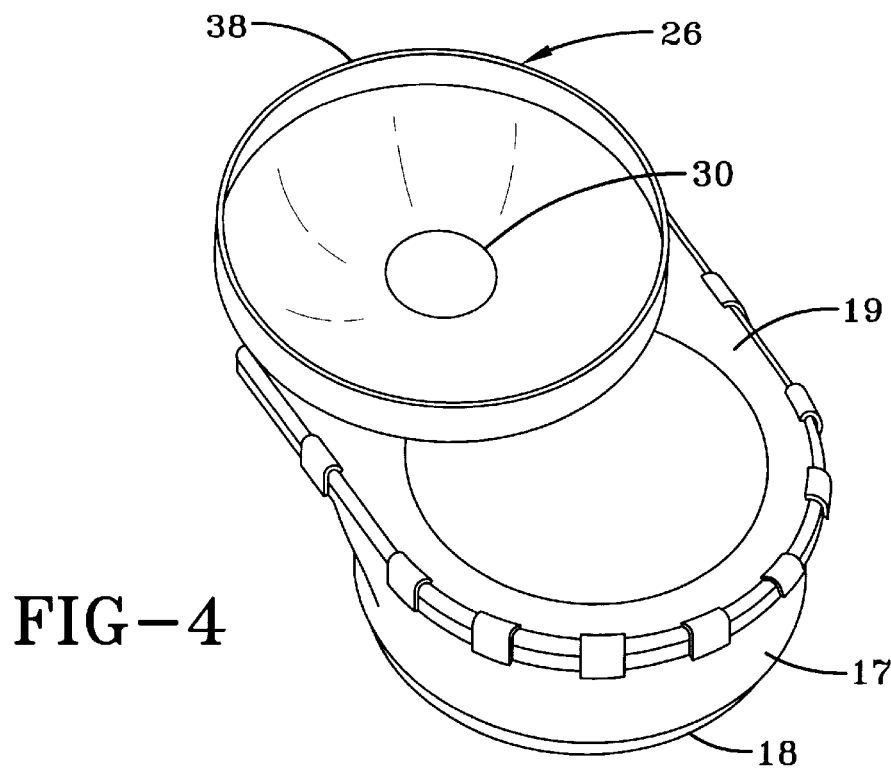
FIG. 4 shows a perspective view of an inflator subassembly including an inflator, a flange, and a gas deflector.
Figure 5:
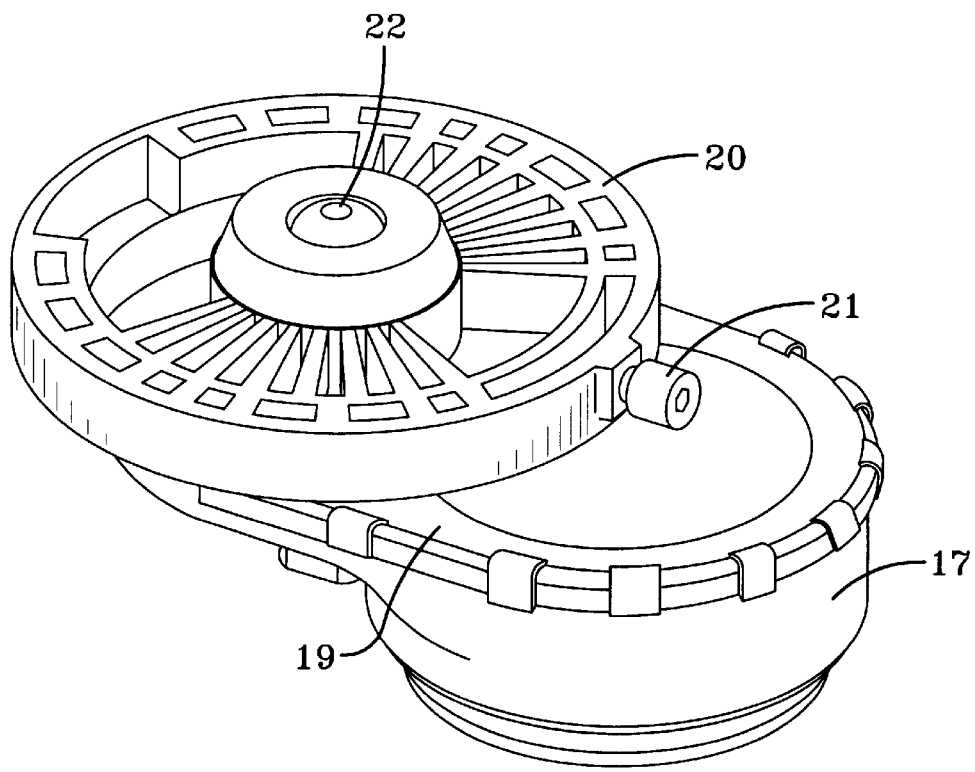
FIG. 5 shows a perspective view of a steering wheel armature along with the inflator subassembly.

FIG. 4 shows a perspective view of the inflator subassembly 27. The inflator subassembly comprises an inflator 18, flange 17, and gas deflector 19. The inflator subassembly 27 is attached to the steering column by way of a bracket 60. For the present invention, a pyrotechnic inflator is utilized, which generates gas by burning of a gas generant. The inflator having a largely round shape sits inside the pan 28 of the flange and can be secured to the flange 17 by welding, a strap, or other suitable means. On the underside portion of the pan 28, there are one or more igniter apertures 14 for receiving electrical wiring for the inflator.

As can be seen from FIG. 4, a gas deflector 19 is secured to the outer portion of the flange 17 by an interlocking engagement. The aperture 30 of the inflator subassembly receives a steering shaft 15. The diameter of the aperture 30 is greater than the diameter for the steering shaft 15 enabling the steering shaft 15 to rotate without causing the gas deflector 17 to rotate.

The inflator 18 is off set mounted as shown in FIG. 4. The inflator 18 is situated on the pan 28 of the gas deflector 17 and does not overlie any portion of the aperture 30. The position of the inflator can be described in relation to the steering shaft 15. Illustrated in FIG. 3, the steering shaft has a longitudinal axis B, which travels through the aperture 30 of the gas deflector 17. The inflator is mounted in a portion of the gas deflector 17 so that the longitudinal axis B of the steering shaft 15 does not pass through the inflator 18, and the inflator 18 and that the inflator does not cover any portion of the aperture 30

A slip ring 16 could be installed in the aperture 30 of the deflector portion 29. A slip ring 16 is part of a slip ring mechanism, which is a rotary electrical connector that is used to make an electrical connection between a vehicle electrical system and an electronic device of the cushion subassembly such as a horn, cruise control, radio buttons, etc. The slip ring mechanism 16 consists of a lower housing 54 that is fixed to the inflator flange 17 and an upper housing 50 that rotates with the steering shaft 15. In between the housings are lower contacts 56 that are flat and are in constant contact With the upper contacts or brushes 58 which contact a slight bend to ensure a reliable electrical connection will exist. The brush is electrically connected to switches on the cushion subassembly 27, and the slip ring is electrically connected to the horns and electrical systems. The slip ring 16 takes the place of the more expensive connector, the contact coil. The contact coil is a more reliable connector, but it is not necessary to use in conjunction with the present invention since the electrical signals for the inflator do not travel through this connector. The electrical wires for the inflator are connected directly to the inflator through the igniter apertures 14.

The inflator subassembly 26 has an flexible lip 38 formed from contoured edges of flange 17 and the gas deflector 19. The flexible lip 38 fits into a circular channel on the bottom portion of the steering wheel armature 20. The diameter of the flexible lip 38 is less than the diameter of the hub portion 34. This results in a small gap between the flexible lip 38 and the hub portion 34 to provide for easy assembly, and so that noise will not be generated as the steering wheel assembly is rotated or encounters vibration. However, during deployment sufficient pressure exists in the inflator flange 17 to cause the flexible lip 38 to flex and come into contact with the hub portion 34 in order to provide a tight seal.

The cushion subassembly 27 comprises a retainer ring 23, an airbag 24, and an airbag cover 25. As mentioned earlier, the cushion subassembly 27 is arranged on the opposite side of the armature than the inflator subassembly 26.

Figure 7:
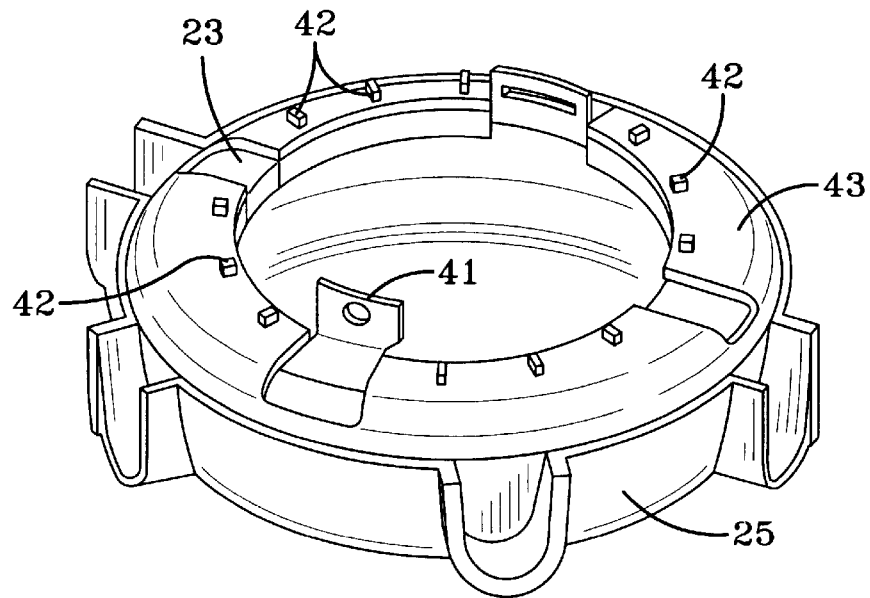
FIG. 7 shows a perspective view of a retainer ring attached to an airbag cover with the cushion folded therein.

The airbag cover 25 and the retainer ring are shown in FIG. 7. This cover is only diagrammatically illustrated as many different configurations of the cover can be used with the present invention. As is known in the art, the purpose of the airbag cover 25 is to provide a decorative fascia, which encloses and protects the airbag 24. In the embodiment illustrated, the airbag cover is of a generally circular configuration, conforming to the shape of the retainer ring 23.

The retainer ring has a circular configuration with a plurality of small tabs 42 and two brackets 41 extending therefrom. The retainer ring is placed into the airbag, and the small tabs 42 and brackets 41 fit through openings in the airbag (not shown). The airbag 24 is folded and the airbag with the retainer ring is placed in the airbag cover 25. The airbag cover 25 has flaps 43 that wrap around the back of the airbag cover. The small tabs 42 from the retainer ring pass through the flaps to retain the, airbag cover, which is shown in FIG. 7.

The cushion subassembly 27 is secured to the top of the steering wheel armature 20 by passing a bolt through the bracket 41 and into the side of the hub portion 34. The cushion subassembly may contain various switches, which may be used to control a horn, radio, tape and/or compact disk player, cruise control, etc. The airbag cover 25 can also fact as a horn switch by the insertion of a membrane horn device (not shown) or a floating horn device (not shown) under the airbag cover 25 One skilled in the art appreciates that other types of horn devices can be utilized that will be actuated upon the application of force on the airbag cover 25. The presence of switches or a horn device under the airbag cover will not interfere with the normal operation of the present invention.

Upon actuation of the inflator, the inflator provides inflation gas, which rapidly travels through the flange 17. This rapid flow of gas causes the flexible lip 38 to flex or expand toward the outer wall of the channel of the hub portion 34. The expansion of the flexible lip reduces the size of the gap thereby reducing inflation gas leakage during airbag deployment. The inflation gas then travels through the orifice of the hub portion 34 into the airbag cushion. The inflation gas causes the airbag 24 to deploy.

FIGS. 8 and 9 illustrate a bracket.60 used to connect the inflator assembly 26 to the steering column. The bracket 60 is typically made from a soft plastic material, and contains a number of integrated rivets 62. The top of these rivets 62 contain posts 64 so that as pressure is applied, they force the legs 66 apart so that it is compression fitted to the inflator flange 17. Two of the rivets 68 are mounted in an opposite direction of the rivets 62 so that the bracket 60 can be riveted to the steering column, thus securing the airbag inflator assembly 26. Many changes and modifications in the above-described embodiment of the invention can, of course, be carried out without departing from the scope thereof. Accordingly that scope is intended to be limited only by the scope of the appended claims.

I claim:

1. A steering wheel assembly comprising:
   a flange (17) adapted to receive a steering shaft (15);
   a gas deflector (19) attached to the flange (17) for directing a flow of inflation gas in a desired direction, wherein an upper edge around the gas deflector (19) and the flange form a flexible lip (38);
   an inflator (18) for providing inflation gas, the inflator (18) being off-set mounted relative to the steering shaft (15);
   an armature (20) comprising a hub portion (34) having a channel that receives the flexible lip (38), wherein the flexible lip flexes toward an outer wall of the channel of the hub portion (34) to reduce gas leakage during airbag deployment.

2. A steering wheel assembly according to claim 1, wherein the inflator (18) does not cover any portion of an aperture (30) of the flange (17).

3. A steering wheel assembly according to claim 1, wherein the gas deflector (19) is secured to a pan (28) of the flange (17) and the inflator is disposed between the pan (28) and the gas deflector (19).

4. A steering wheel assembly according to claim 1 further comprising a slip ring (16) installed on a side of a pan (28).

5. A steering wheel assembly according to claim 1 wherein the armature and the inflator (18) are rotationally decoupled.

6. A steering wheel assembly according to claim 1 further comprising a fastener (22) for fastening the armature (20) to the steering shaft (15), wherein the steering shaft (15) passes through an aperture (20) of the flange (17).

7. A steering wheel assembly according to claim 1 further comprising a retainer ring (23) for securing an airbag (24) to the armature (20), the airbag (24) and the retainer ring (23) are disposed on one side of the armature (20) while the inflator (18) is disposed on another side of the armature (20).

8. A steering wheel assembly according to claim 1 further comprising a bracket (60) for connecting the flange (17) to a steering column, the bracket (60) comprises a plurality of integrated rivets (62).

9. A steering wheel assembly comprising:

an inflator subassembly (26) having an inflator (18), a flange (17) with a pan (28) for holding the inflator (18), and an aperture (30) therethrough that receives a steering shaft (15);

an armature (20) comprising a hub portion (34) that receives a flexible lip of the inflator subassembly (26);

a cushion subassembly (27) comprising a retainer ring (23) for securing an airbag (24) to the armature (20) and an airbag cover (25) for covering the airbag (24), wherein the cushion subassembly (27) and inflator subassembly (26) are arranged on opposite sides of the armature;

wherein the flexible lip (38) of the inflator subassembly fits into a channel in the hub portion (34), the flexible lip (38) flexes toward an outer wall of the channel in the hub portion (34) to reduce gas leakage during airbag deployment.

10. A steering wheel assembly according to claim 9, wherein the inflator (18) is off-set mounted relative to the steering shaft (15).

11. A steering wheel assembly according to claim 9, wherein the inflator subassembly (26) further comprises an gas deflector (19) for deflecting the flow of inflation gas, the gas deflector (19) is secured to the pan (28) and the inflator (18) is disposed between the pan (28) and the gas deflector (19).

12. A steering wheel assembly according to claim 9 further comprising a slip ring (16) installed on a side of the pan (28).

13. A steering wheel assembly according to claim 9 wherein the armature (20) and the inflator subassembly (26) are rotationally decoupled.

14. A steering wheel assembly according to claim 9 further comprising a fastener (22) for fastening the armature (20) to the steering shaft (15), which passes through the aperture (30) of the flange (17).

\* \* \* \* \*